United States Patent [19]

Bingham

[11] 4,277,197
[45] Jul. 7, 1981

[54] TELESCOPING TOOL AND COUPLING MEANS THEREFOR

[75] Inventor: Allen H. Bingham, Lithonia, Ga.

[73] Assignee: Kearney-National, Inc., Atlanta, Ga.

[21] Appl. No.: 111,658

[22] Filed: Jan. 14, 1980

[51] Int. Cl.³ ............................................... F16B 7/10
[52] U.S. Cl. ..................................... 403/104; 403/342
[58] Field of Search ...................... 403/104, 109, 342; 285/298, 322, 323; 248/188.5

[56] References Cited

U.S. PATENT DOCUMENTS

| | | | |
|---|---|---|---|
| 2,184,358 | 12/1939 | Moore | 403/109 X |
| 2,319,992 | 5/1943 | Hubbard | 403/109 X |
| 2,496,402 | 2/1950 | McVeigh et al. | 285/323 X |
| 2,700,370 | 1/1955 | Goff | 285/322 X |
| 4,047,821 | 9/1977 | Hoke et al. | 403/109 |

*Primary Examiner*—Andrew V. Kundrat
*Attorney, Agent, or Firm*—Rodgers & Rodgers

[57] ABSTRACT

A telescoping tool includes a plurality of telescoping tubes interconnected by coupling means each of which comprises an exteriorly threaded sleeve secured to one end of an outer telescoping tube and having an inner outwardly tapered surface a part of which is of the configuration of a truncated cone, a tubular wedge having an outer surface of complementary configuration to said part of the inner surface of said sleeve together with an outwardly projecting coupling element preferably in the form of an exterior flange together with a cap sleeve having internal threads and which is threadedly related with the exterior surface of the sleeve and arranged when tightened to force the tubular wedge into the sleeve and toward the adjacent end of the outer tube so as to grip frictionally the exterior surface of an inner telescoping tube and thereby to secure the telescoping tubes together in frictional relationship, an inner recess or groove being formed interiorly of the cap sleeve and adjacent its cap portion for receiving the outwardly projecting coupling element of the tapered tube so that loosening of the cap sleeve removes the tubular wedge from its position of high friction contact between the inner surface of the sleeve and the outer surface of the inner telescoping tube. If more than two telescopically related tubes are employed to form the tool, additional coupling means may be employed so that the length of the pole may be adjusted to any desired length from a minimum length equal to the length of the outermost sleeve to a maximum length equivalent to the sum of the lengths of all of the tubes or to any pole length between minimum and maximum.

2 Claims, 3 Drawing Figures

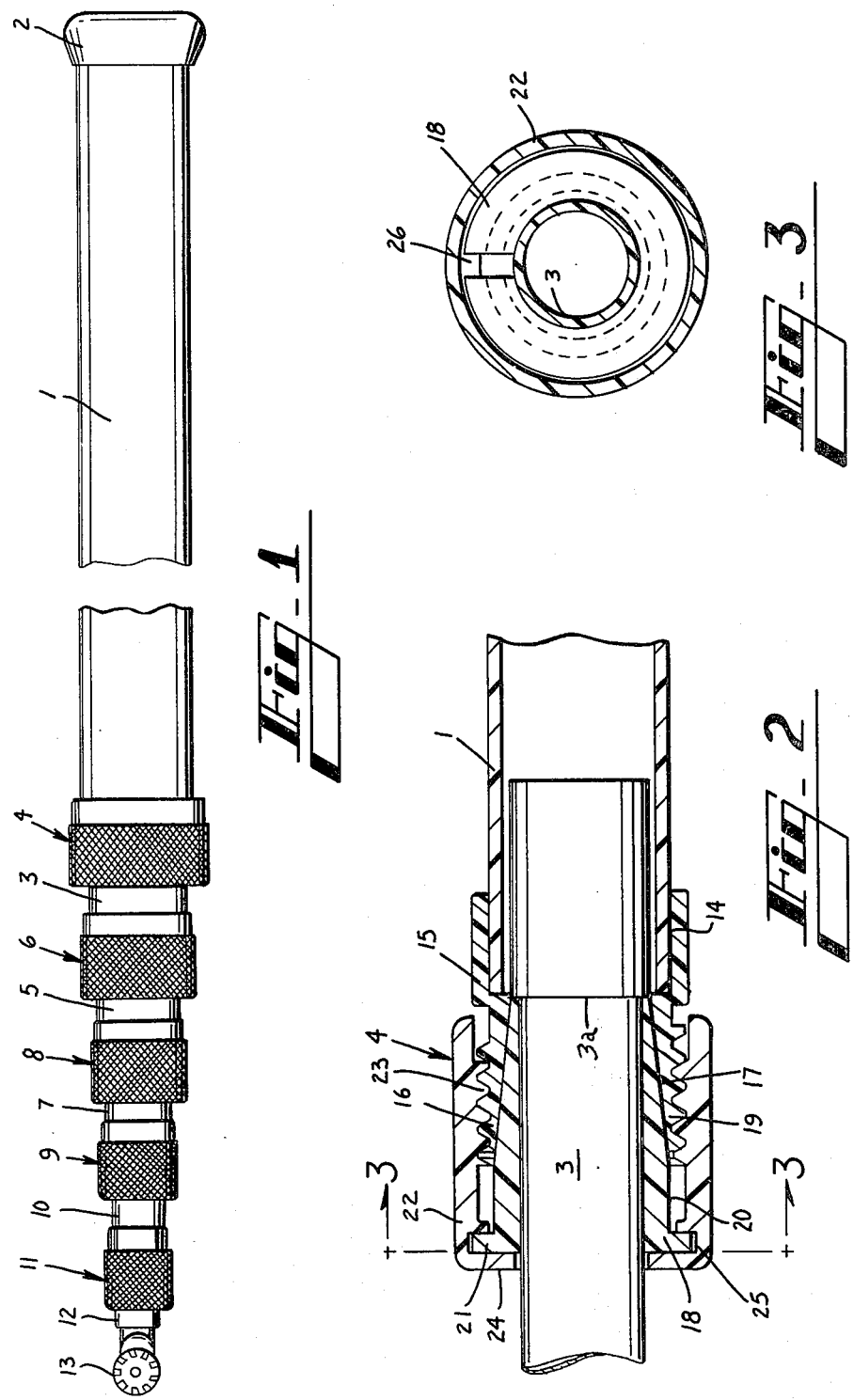

TELESCOPING TOOL AND COUPLING MEANS THEREFOR

TECHNICAL FIELD

This invention relates to an extensible tool especially adapted for use in manipulating devices disposed at different distances from the normal position of an operator. The device is especially well suited for use by an electric lineman in manipulating electric components mounted on power line poles and the like.

BACKGROUND ART

Extensible poles formed of a plurality of telescoping tubular elements are known and may comprise complementary elements having cooperating inner and outer conically shaped surfaces and which are secured to telescopic elements together with a cap threadedly related to one of the conical elements for establishing a high friction contact which frictionally secures the telescopically related elements together. Examples of such prior structures are disclosed in U.S. Pat. Nos. 2,980,456 McMillen, 3,831,983 Stickler, 3,955,835 Farrington, 3,992,043 Whitley, 896,204 Glauber and in Belgian patent No. 528,635. While coupling means of the prior art is known which effectively secures telescopically related tubular elements in desired telescoping relationships by frictional means, such devices are not ordinarily well adapted for both establishing and relieving high frictional contact between elements to be secured together.

DISCLOSURE OF THE INVENTION

According to this invention in one form, an exteriorly threaded sleeve is secured by known suitable means to one end of an outer telescoping tube and is provided with a conically shaped outwardly tapered inner surface for cooperating with an exteriorly tapered tubular wedge disposed therein which wedge is forced into high friction contact with an inner telescoping tube disposed within the wedge by means of a cap sleeve having an inner flange for engaging the outer end of the tubular wedge and which is interiorly threaded for cooperating with the exterior threads of the sleeve secured to the outer telescoping tube. According to a feature of the invention, the tapered tubular wedge is provided with a longitudinal slit together with an outwardly protruding coupling element preferably in the form of an exterior flange disposed in a recess or groove formed within the cap sleeve and adjacent its flange so that tightening or loosening rotation of the cap sleeve relative to the outer sleeve imparts tightening or loosening movement to the tubular wedge. According to another feature of the invention the inner telescoping tubular element is provided with a shoulder which is engageable with the inner end of the tubular wedge so as to secure the telescoping tubes against undesired uncoupling movement in one relative direction and to establish a maximum degree of extension of one tubular element relative to the other.

BRIEF DESCRIPTION OF THE DRAWINGS

In the drawings

FIG. 1 is a side view of a telescoping tool or pole constructed in accordance with one form of the invention;

FIG. 2 is a cross-sectional view of one coupling means a plurality of which are shown in FIG. 1; and FIG. 3 is a cross-sectional view taken along the line designated 3—3 in FIG. 2.

BEST MODE FOR CARRYING OUT THE INVENTION

In FIG. 1, the numeral 1 designates a tubular element having a closure cap 2. Disposed partially inside outer tubular element 1 is a telescopically related tubular element 3. Telescopic elements 1 and 3 are frictionally interrelated by coupling means generally designated by the numeral 4. In like fashion telescopic tube 5 is disposed within telescopic tube 3 and is frictionally interrelated therewith by coupling means generally designated at 6. Similarly telescopic tube 7 is disposed within telescoping tube 5 and is frictionally related therewith by coupling means 8. Coupling means 9 frictionally interconnects telescoping tube 10 with telescoping tube 7 while frictional coupling means 11 interrelates telescoping tube 12 with telescoping tube 10. Tool mounting devices 13 is of conventional construction and as such forms no part of this invention. Tool mounting device 13 is simply rigidly secured to the outer left hand end of telescoping tube 12 as viewed in FIG. 1 and is provided with suitable structure for engaging and supporting a manipulating element such as a hook or other known device.

While the coupling devices generally indicated at 4, 6, 8, 9 and 11 in FIG. 1 are of progressively smaller diameters from right to left, these structures are formed of components which are of identical constructional details and relationships of parts.

According to this invention the coupling means shown in detail in FIGS. 2 and 3 is provided and is generally designated by the numeral 4. As is apparent especially from FIG. 2 outer tube 1 is secured at its left hand end by suitable cement 14 to the inner surface of one end of sleeve 15. Sleeve 15 is exteriorly threaded as indicated at 16 and is provided with a conically shaped inner surface 17 in the shape of a truncated cone. Disposed inside sleeve 15 is a tubular wedge 18 having an exterior surface 19 which is in the shape of a truncated cone and which is complementary in configuration to the inner surface 17 of sleeve 15. Tubular wedge 18 is also provided with a cylindrically shaped exterior surface 20 together with an outwardly projecting coupling element 21 which as indicated in FIG. 2 may take the form of an exterior flange. Disposed inside tubular wedge 18 is telescoping tube 3 having a shoulder portion 3a for engaging the right hand end of tubular wedge 18 as shown in FIG. 2.

For forcing the tubular wedge 18 toward the right so as to establish a high frictional contact with the exterior surface of telescoping tube 3 and with the interior conically shaped surface 17 of sleeve 15, a cap sleeve 22 is provided. This cap sleeve is interiorly threaded as indicated at 23 and such threads cooperate with the exterior threads 16 on sleeve 15. Cap sleeve 22 is provided with an inwardly extending cap portion 24 and with an interior recess or groove 25. As is apparent from FIG. 2 the frictional relationship between the tubular wedge 18 and the exterior surface of telescoping element 3 and the interior conically shaped surface 17 of sleeve 15 may be relieved by simply unscrewing the cap sleeve 22 relative to the sleeve 15 since such an operation moves the tubular wedge 18 toward the left relative to sleeve 15 and telescoping tube 1 as viewed in FIG. 2 so as to relieve the frictional contact therebetween. Also from FIG. 2 it is apparent that telescoping element 3 is limited in movement toward the left and outwardly relative to outer tube 1 due to engagement of its shoulder 3a with the right hand end of tubular wedge 18.

In order to render the tubular wedge 18 adaptable for conforming to the exterior surface of telescoping tube 3 and to the interior surface 17 of sleeve 15 as well as to make it possible to insert the flange 21 into the groove 25, a longitudinal slot 26 is formed in tubular wedge 18 as is shown in FIG. 3.

Cap 2 serves to close the end of tube 1 and prevents foreign matter from entering the tube. Also cap 2 serves as a stop for the right hand ends of tubes 3, 5, 7, 10 and 12 when the tool is collapsed to its shortest length.

Tubes 3, 5, 7, 10 and 12 are progressively longer from right to left and engage cap 2 when the tool is collapsed. This feature prevents finger pinching between the right hand or inner end of sleeve 15 of each tube other than tube 1 and the left hand or outer end of internally threaded caps 4, 6, 8 and 9.

For the purpose of excluding moisture from the interior of tube 12, that tube preferably is filled with suitable foam material such as urethane.

While the invention is not limited to a particular material, it has been found that certain parts of the tool such as the tubes 1, 3, 5, 7, 10 and 12, the sleeve 15, the wedge 18 and the cap sleeve 22 may be formed of a thermo-set plastic such as glass reinforced polyester.

Furthermore it is apparent that the coupling means of this invention provides a positive lock against relative longitudinal movement in any direction and also against relative rotation in any direction of the coupled parts. Furthermore it is not necessary to use tools in order to disassemble the mechanism and, if desired, the pole length may be adjusted to any fraction of the length of one or more tubes plus the length of tube 1 and is not limited to pole lengths which are simple multiples of the length of one tube.

Also a lineman, for example, may remove a component from a power line pole by simply loosening one of the coupling elements sufficiently to allow the removed item to descend at a controlled rate depending on its weight and on the degree of friction established by the lineman. This feature is particularly well suited for use in conjunction with apparatus which is susceptible to damage if jostled unduly or if dropped to the ground.

INDUSTRIAL APPLICABILITY

A telescoping pole formed according to this invention is not limited to any particular application but is well suited for use in conjunction with power line maintenance by enabling a lineman on the ground to service, replace or repair devices disposed on power line poles and out of normal reach of the lineman.

I claim:

1. A coupling for frictionally connecting a pair of telescopically related tubes said coupling comprising an externally threaded sleeve secured to and forming an extension of one end of the outer one of said telescopically related tubes and having an outwardly tapered interior surface of the configuration of a truncated cone, a tubular wedge disposed about the inner one of said telescopically related tubes and within a part of said sleeve, said wedge having an outer surface at least a part of which is tapered and of complementary configuration to said interior surface of said sleeve and having an outwardly projecting coupling element, an internally threaded cap sleeve in threaded engagement with said sleeve and having a part in engagement with one end of said wedge for urging said wedge into tight frictional contact between the inner one of said telescopically related tubes and said sleeve so as effectively to interlock said telescopically related tubes in coordination with tightening of said cap sleeve, a recess formed in said cap sleeve and receiving said outwardly projecting coupling element whereby said wedge is moved out of tight frictional contact with said sleeve and with the inner one of said telescopically related tubes in coordination with loosening of said cap sleeve, and a closure cap secured to the outer one of said telescopically related tubes at the other end thereof, the inner one of said telescopically related tubes being somewhat longer than the outer one of said telescopically related tubes so that the inner end of the externally threaded sleeve which is secured to the inner longer one of said telescopically related tubes is spaced somewhat from the outer end of the internally threaded cap sleeve which is associated with the outer larger one of said telescopically related tubes so as to prevent pinching the finger or hand of the operator during a collapsing operation of said tubes.

2. A coupling for frictionally connecting a pair of telescopically related tubes said coupling comprising an externally threaded sleeve secured to and forming an extension of one end of the outer one of said telescopically related tubes and having an outwardly tapered interior surface of the configuration of a truncated cone, a tubular wedge disposed about the inner one of said telescopically related tubes and within a part of said sleeve, said wedge having an outer surface at least a part of which is tapered and of complementary configuration to said interior surface of said sleeve and having an outwardly projecting coupling element, an internally threaded cap sleeve in threaded engagement with said sleeve and having a part in engagement with one end of said wedge for urging said wedge into tight frictional contact between the inner one of said telescopically related tubes and said sleeve so as effectively to interlock said telescopically related tubes in coordination with tightening of said cap sleeve, and a recess formed in said cap sleeve and receiving said outwardly projecting coupling element whereby said wedge is moved out of tight frictional contact with said sleeve and with the inner one of said telescopically related tubes in coordination with loosening of said cap sleeve, and said inner one of said telescopically related tubes being filled with foam.

* * * * *